(12) United States Patent
Chen et al.

(10) Patent No.: US 11,947,155 B1
(45) Date of Patent: Apr. 2, 2024

(54) ELECTRONIC DEVICE WITH LIGHT EMITTING FUNCTION

(71) Applicant: Chicony Electronics Co., Ltd., New Taipei (TW)

(72) Inventors: Chien-Yueh Chen, New Taipei (TW); Yu-Hsuan Lin, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 18/455,190

(22) Filed: Aug. 24, 2023

(30) Foreign Application Priority Data

Feb. 23, 2023 (TW) ................................ 112106814

(51) Int. Cl.
*F21V 8/00* (2006.01)
*F21V 33/00* (2006.01)
*H04R 1/02* (2006.01)

(52) U.S. Cl.
CPC .......... *G02B 6/0076* (2013.01); *F21V 33/008* (2013.01); *G02B 6/0045* (2013.01); *H04R 1/028* (2013.01)

(58) Field of Classification Search
CPC .... G02B 6/0045; G02B 6/0076; F21V 33/008
See application file for complete search history.

(56) References Cited

U.S. PATENT DOCUMENTS

| | | | | |
|---|---|---|---|---|
| 8,467,013 | B2* | 6/2013 | Gourlay | G02B 6/0043 |
| | | | | 349/67 |
| 8,721,101 | B2* | 5/2014 | Holten | G02B 6/0073 |
| | | | | 362/97.3 |
| 2002/0097578 | A1* | 7/2002 | Greiner | G02F 1/133603 |
| | | | | 362/240 |
| 2008/0089093 | A1* | 4/2008 | Miller | G02B 5/045 |
| | | | | 362/613 |
| 2012/0176813 | A1* | 7/2012 | Holten | G02B 6/0055 |
| | | | | 362/606 |

FOREIGN PATENT DOCUMENTS

| | | |
|---|---|---|
| EP | 2480918 B1 | 7/2016 |
| JP | 200993813 A | 4/2009 |

* cited by examiner

*Primary Examiner* — Thomas M Sember
(74) *Attorney, Agent, or Firm* — MUNCY, GEISSLER, OLDS & LOWE, PC (57) ABSTRACT

An electronic device with light emitting function includes a casing, a circuit board, a light-shielding member, a first light-guiding member, and a second light-guiding member. The casing has a light-guiding cover plate having a first partial block and a second partial block. The circuit board has a light-emitting element adjacent to the first partial block. The light-shielding member is blocked between the light-emitting element and the first partial block. The first light-guiding member has a first reflective inclination surface at a light-emitting direction of the light-emitting element and configured to reflect a light emitted by the light-emitting element to be a first reflected light which is transmitted toward a direction away from the first partial block. The second light-guiding member has a second reflective inclination surface configured to reflect the first reflected light to be a second reflected light which is irradiated to the second partial block.

10 Claims, 10 Drawing Sheets

ELECTRONIC DEVICE WITH LIGHT EMITTING FUNCTION

CROSS-REFERENCE TO RELATED APPLICATION

This non-provisional application claims priority under 35 U.S.C. § 119(a) to Patent Application No. 112106814 filed in Taiwan, R.O.C. on Feb. 23, 2023, the entire contents of which are hereby incorporated by reference.

BACKGROUND

Technical Field

The instant disclosure relates to an electronic device, in particular, to an electronic device with light emitting function.

Related Art

Many electronic devices on the market are provided with the light emitting function. For example, a light-emitting element (such as an LED) may be assembled in the electronic device, so that through the light emission of the light-emitting element, the electronic device can provide functions of illumination, indication, or the like, and the electronic device can be used in dark circumstances.

SUMMARY

In general, for an electronic device known to the inventor(s), the casing of the electronic device has a light-transmitting region to correspond to the light-emitting element, so that the light emitted by the light-emitting element can directly pass through the light-transmitting region so as to be transmitted outside the casing. However, such configuration may cause uneven light emission; specifically, parts of the light-transmitting region of the casing closer to the light-emitting element have a higher luminance, while parts of the light-transmitting region of the casing farer from the light-emitting element have a reduced luminance.

In view of this, in one embodiment, an electronic device with light emitting function is provided. The electronic device comprises a casing, a circuit board, a light-shielding member, a first light-guiding member, and a second light-guiding member. The casing has a light-guiding cover plate, and the light-guiding cover plate has a first partial block and a second partial block. The circuit board is disposed in the casing, the circuit board has a light-emitting element, and the light-emitting element is adjacent to the first partial block of the light-guiding cover plate. The light-shielding member is disposed in the casing, and the light-shielding member is blocked between the light-emitting element and the first partial block. The first light-guiding member is disposed in the casing, the first light-guiding member has a first reflective inclination surface, the first reflective inclination surface is at a light-emitting direction of the light-emitting element, the first reflective inclination surface is configured to reflect a light emitted by the light-emitting element to be a first reflected light, and the first reflected light is transmitted toward a direction away from the first partial block. The second light-guiding member is disposed in the casing, the light-emitting element is between the light-shielding member and the second light-guiding member, and the second light-guiding member has a second reflective inclination surface. The second reflective inclination surface is configured to reflect the first reflected light to be a second reflected light, and the second reflected light is irradiated to the second partial block of the light-guiding cover plate.

Based on the above, in the electronic device according to one or some embodiments of the instant disclosure, the light-shielding member is blocked between the light-emitting element and the first partial block of the light-guiding cover plate which is adjacent to the light-emitting element. Therefore, the issue of excessive luminance on some portions of the light-guiding cover plate can be prevented. Moreover, the first reflective inclination surface and the second reflective inclination surface sequentially reflect the light emitted by the light-emitting member, so that the light can be irradiated to the second partial block of the light-guiding cover plate which is not adjacent to the light-emitting element, and the illumination range can be further expanded, thus allowing the light-guiding cover plate to illuminate uniformly.

BRIEF DESCRIPTION OF THE DRAWINGS

The disclosure will become more fully understood from the detailed description given herein below for illustration only, and thus not limitative of the disclosure, wherein.

DETAILED DESCRIPTION

It is noted that, the embodiments, the terms "first", "second", "third", and "fourth" are provided to describe different elements, and the these elements are not thus limited by using these terms. Furthermore, for the sake of convenience and clarity in the description, thicknesses or sizes of the elements in the drawings illustrated in an exaggerated, omitted, or general manner are used to help a person skilled in the art with comprehension and reading, and the sizes of the elements are not completely the actual sizes and are not intended to limit any restraint conditions under which the instant disclosure can be implemented and therefore have no technical significance. Any modification to the structures, change to the proportional relationships, or adjustment on the sizes without affecting the effects and the objectives that can be achieved according to the instant disclosure should fall within the scope of the technical content disclosed by the instant disclosure. In all the figures, the same reference numbers refer to identical or similar elements.

Figure 1:
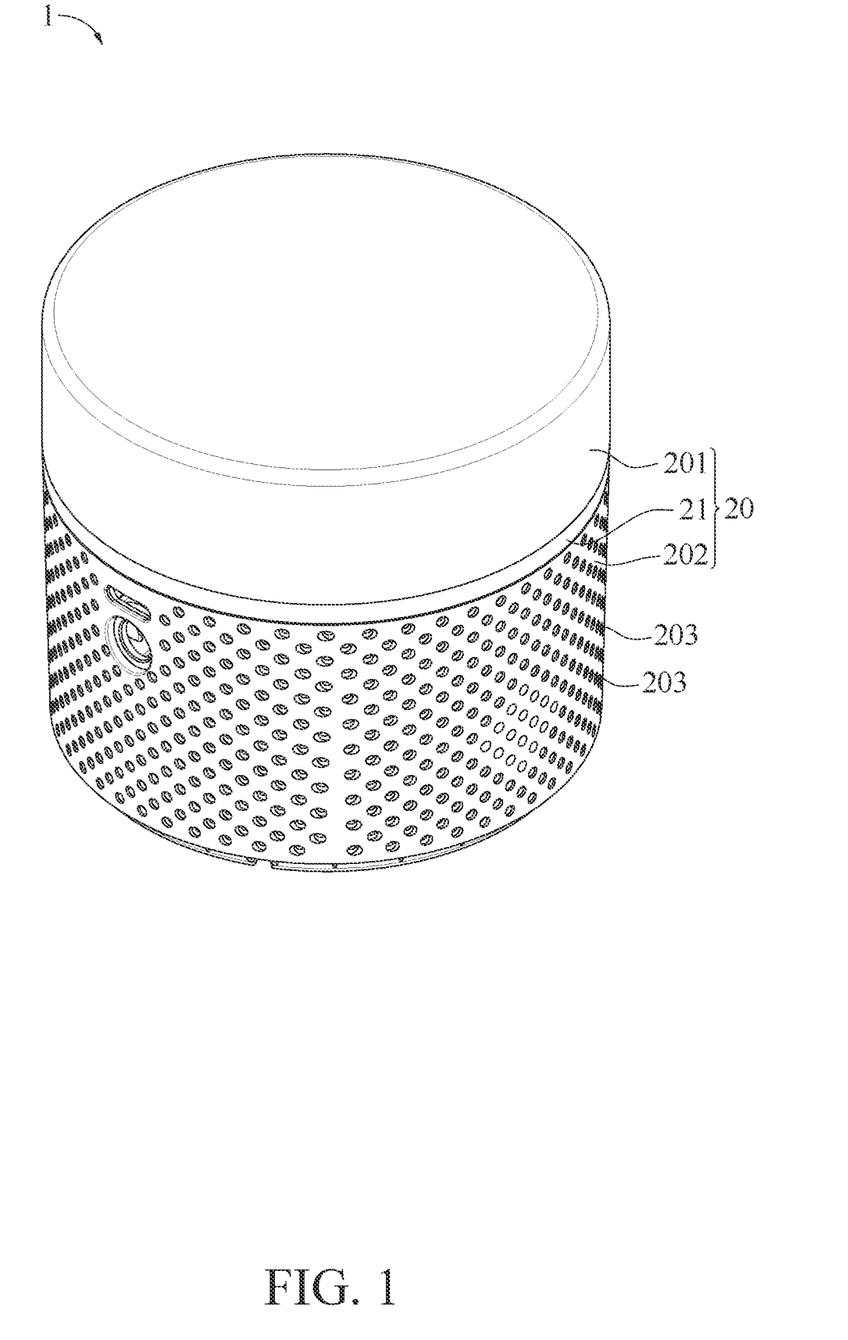
FIG. 1 illustrates a perspective view of an electronic device according to a first embodiment of the instant disclosure.
Figure 2:
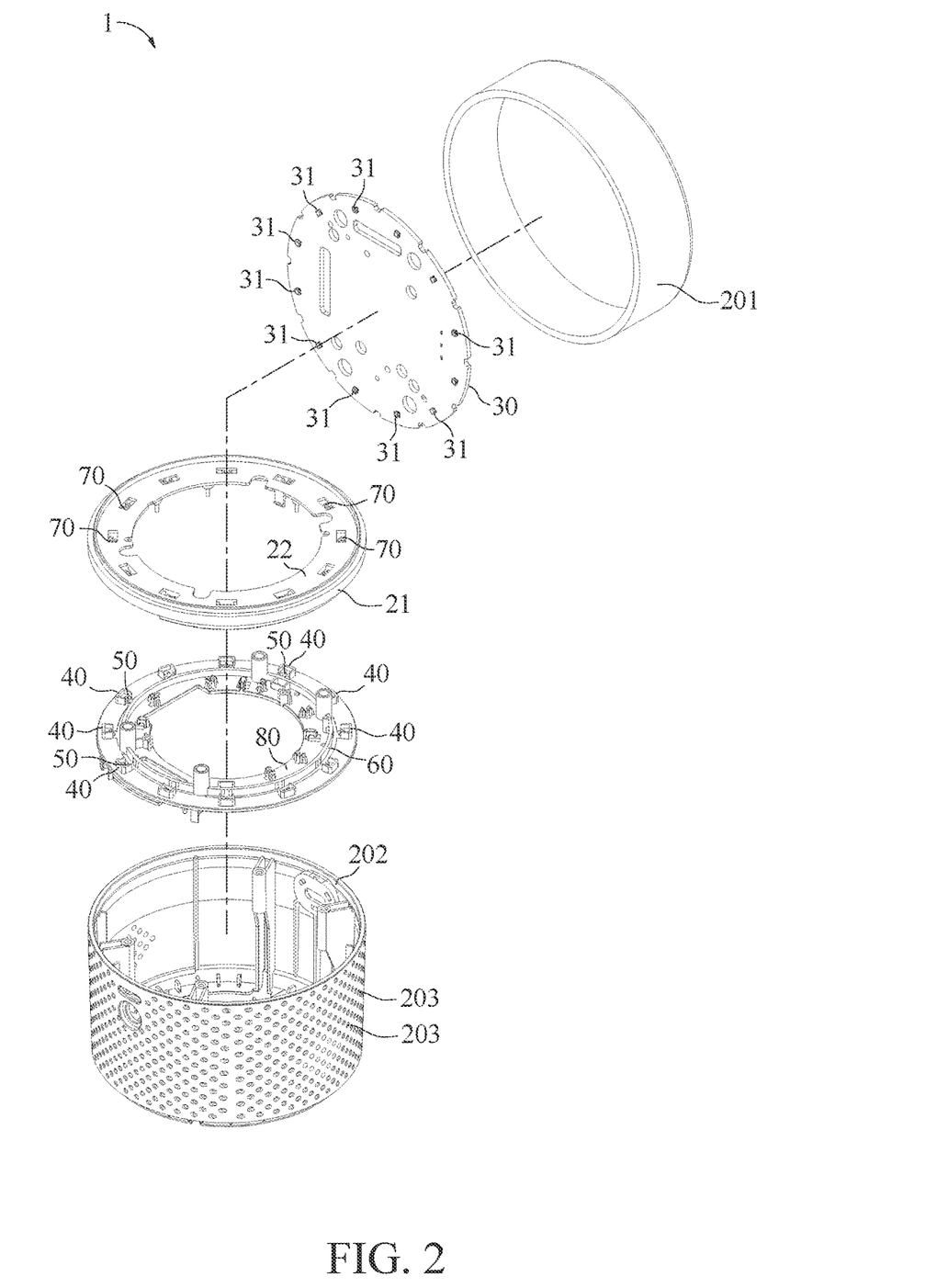
FIG. 2 illustrates an exploded view of the electronic device of the first embodiment of the instant disclosure.

FIG. 1 illustrates a perspective view of an electronic device according to a first embodiment of the instant disclosure. FIG. 2 illustrates an exploded view of the electronic device of the first embodiment of the instant disclosure. As shown in FIG. 1 and FIG. 2, in this embodiment, the electronic device 1 comprises a casing 20, a circuit board 30, a light-shielding member 40, a first light-guiding member 50, and a second light-guiding member 60. The electronic device 1 may be an electronic product with light-emitting requirements, for example, the electronic device 1 may be a speaker (as shown in FIG. 1), a camera device, or other home appliances.

As shown in FIG. 1 and FIG. 2, the casing 20 has a light-guiding cover plate 21. The light-guiding cover plate 21 is a portion of the casing 20 for passing through the light. Specifically, in some embodiments, the light-guiding cover plate 21 may be made of light-guiding material(s). For example, the light-guiding cover plate 21 may be made of polycarbonate (PC), polymethylmethacrylate (PMMA), or glass to have light-guiding function. After the light enters inside the light-guiding cover plate 21, the light can be transmitted inside the light-guiding cover plate 21 and reflected several times to allow the entire light-guiding cover plate 21 to illuminate.

In some embodiments, the surface of the light-guiding cover plate 21 is further provided with light-guiding microstructures. For example, the light-guiding microstructures may be printed spots, anti-glare structures, light diffusion agent layers, or the like, thereby further increasing the uniformness of the illumination of the entire light-guiding cover plate 21.

As shown in FIG. 1 and FIG. 2, the casing 20 may be formed by assembling several case bodies with each other. In this embodiment, the casing 20 comprises a first case body 201 and a second case body 202. The first case body 201 and the second case body 202 are made of opaque material(s). For example, the first case body 201 and the second case body 202 may be respectively metal case bodies or black plastic case bodies. The light-guiding cover plate 21 is assembled between the first case body 201 and the second case body 202. For example, the first case body 201, the light-guiding cover plate 202, and the second cases body 202 may be assembled and fixed with each other through adhering, engaging, locking, or other manners. Moreover, in this embodiment, the electronic device 1 is a speaker device, and the casing 20 has several sound output holes 203, so that sounds can be transmitted outward from the sound output holes 203.

As shown in FIG. 1 and FIG. 2, in this embodiment, the light-guiding cover plate 21 has an annular shape. For example, the light-guiding cover plate 21 may be a round annular cover plate (as shown in FIG. 2), a rectangular annular cover plate, an elliptical annular cover plate, or annular cover plates with other shapes. In some embodiments, the light-guiding cover plate 21 may have a non-annular shape. For example, the light-guiding cover plate 21 may be a round cover plate, a rectangular cover plate, an elliptical cover plate, or cover plates with other shapes. In other words, in some embodiments, the shape of the light-guiding cover plate 21 may be determined based on the actual product demands.

As shown in FIG. 1 and FIG. 2, the circuit board 30 is disposed in the casing 20 and adjacent to the light-guiding cover plate 21. The circuit board 30 has at least one light-emitting element 31. For example, the light-emitting element 31 may be a light-emitting diode (LED), a halogen lamp, a tungsten lamp, or the like. In this embodiment, the number of the light-emitting element 31 is plural (here, the number of the light-emitting element 31 is twelve), and the light-emitting elements 31 are spaced apart from each other and annularly arranged on the periphery of the surface of the circuit board 30.

Figure 3:
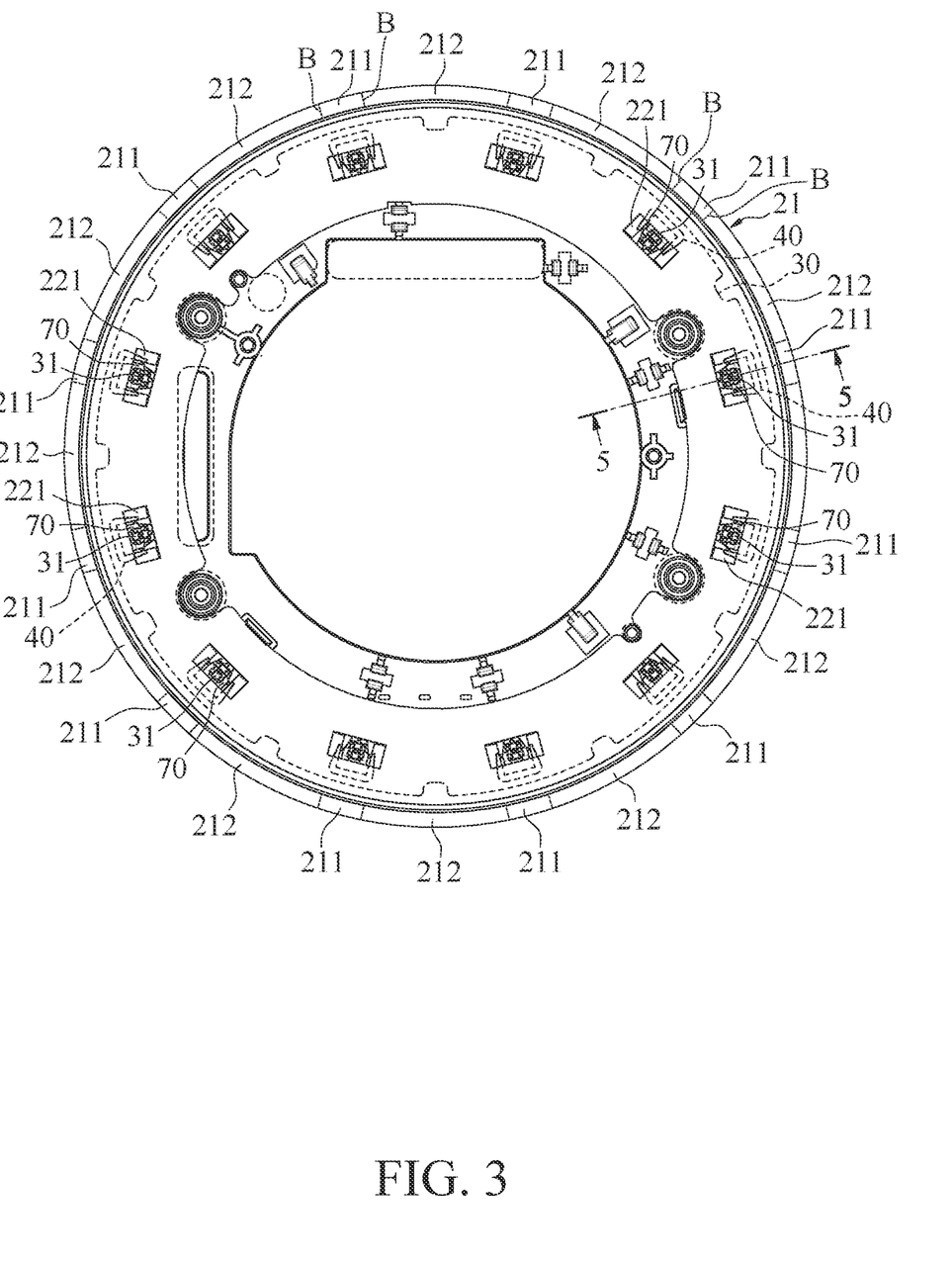
FIG. 3 illustrates a plan view of the electronic device of the first embodiment of the instant disclosure.
Figure 4:
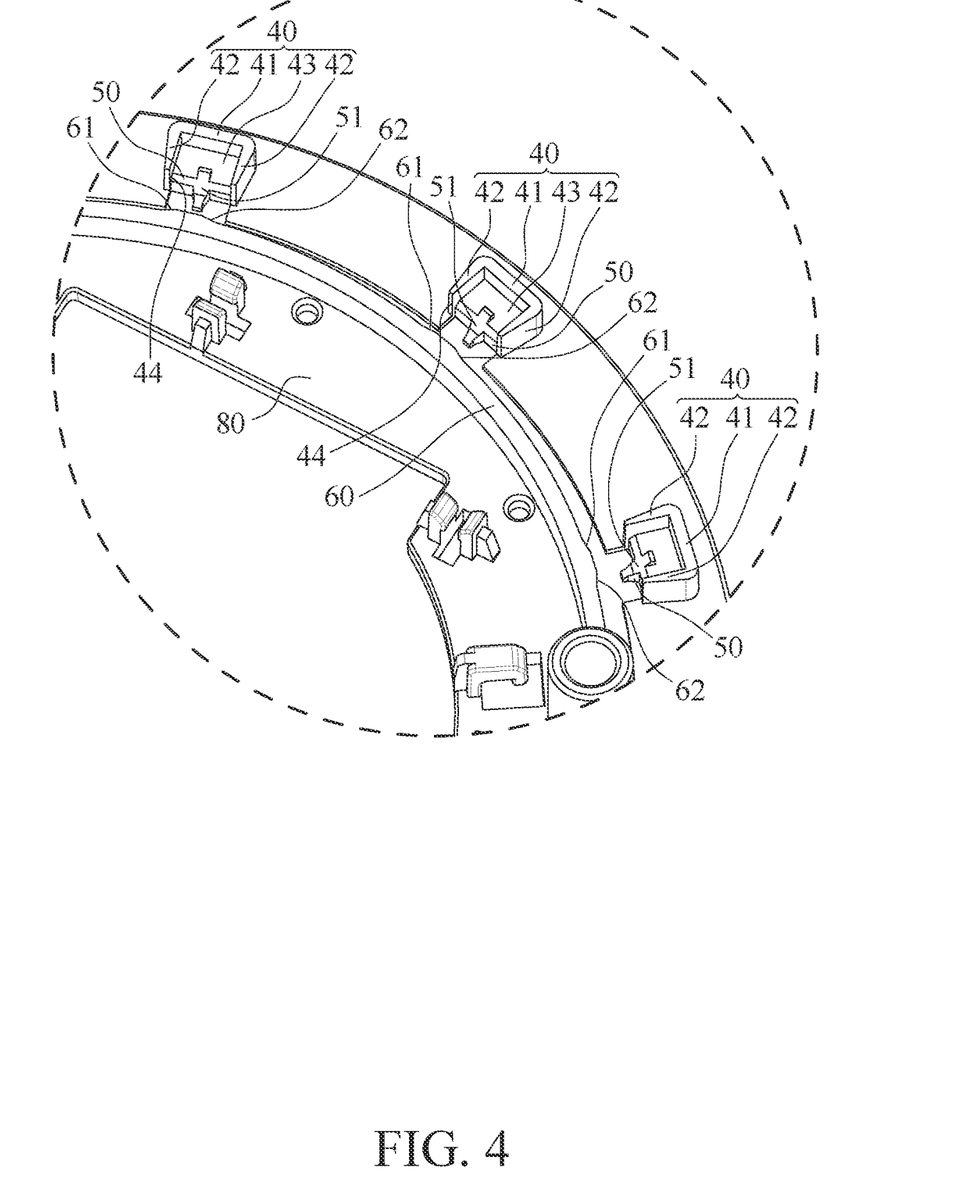
FIG. 4 illustrates an enlarged partial perspective view of the electronic device of the first embodiment of the instant disclosure.
Figure 5:
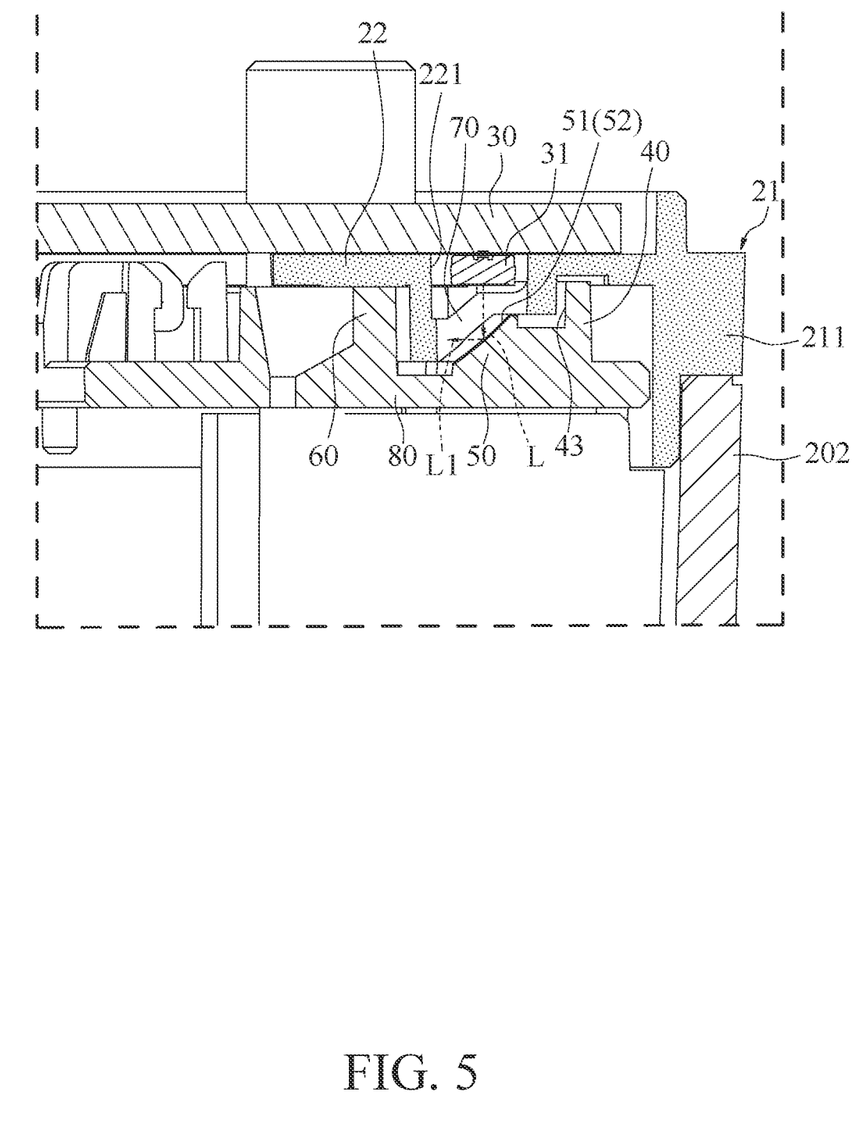
FIG. 5 illustrates a cross-sectional view along the line 5-5 shown in FIG. 3.
Figure 6:
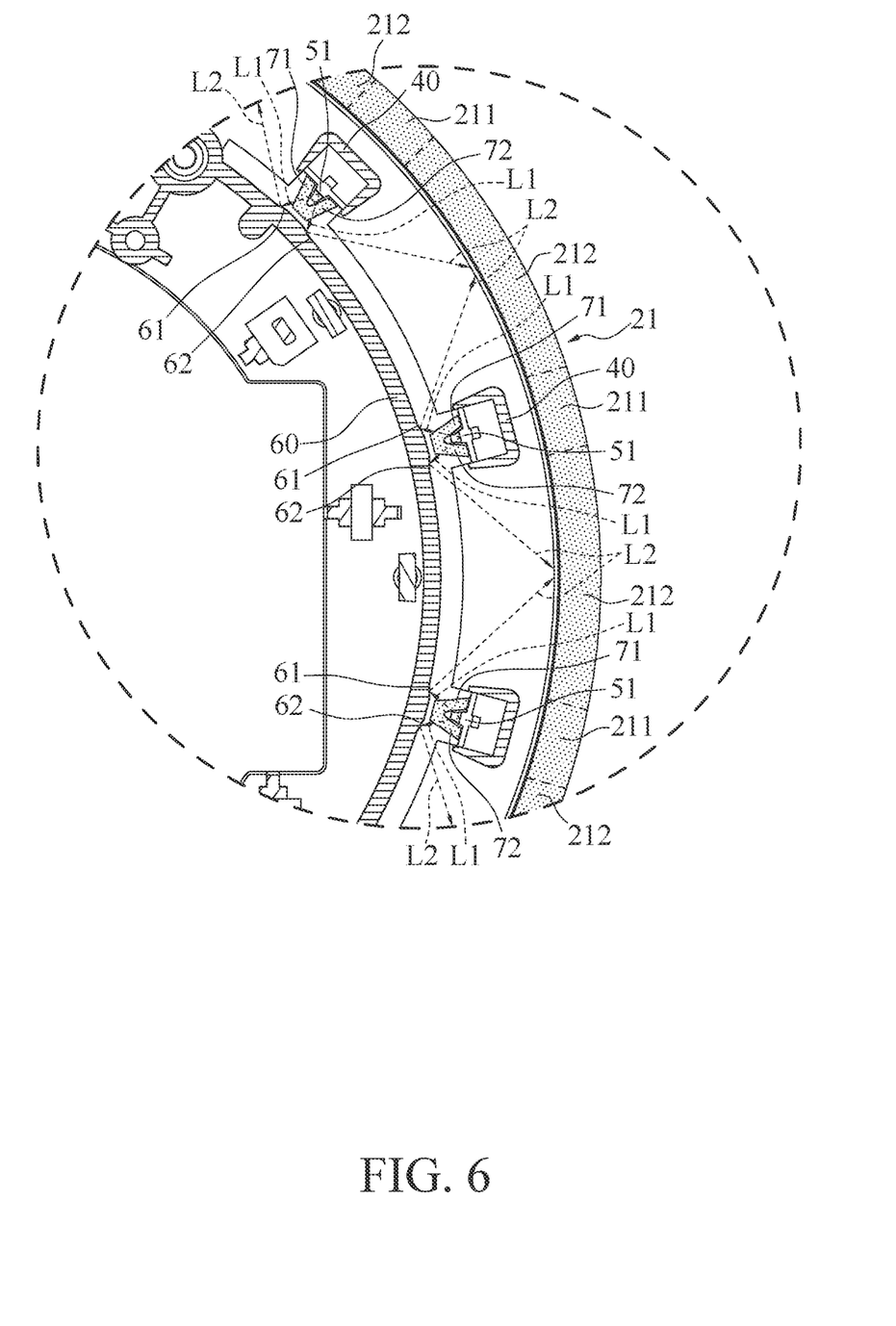
FIG. 6 illustrates a cross-sectional view of the electronic device of the first embodiment of the instant disclosure.

FIG. 3 illustrates a plan view of the electronic device of the first embodiment of the instant disclosure. FIG. 4 illustrates an enlarged partial perspective view of the electronic device of the first embodiment of the instant disclosure. FIG. 5 illustrates a cross-sectional view along the line 5-5 shown in FIG. 3. FIG. 6 illustrates a cross-sectional view of the electronic device of the first embodiment of the instant disclosure. As shown in FIG. 3, the light-guiding cover plate 21 has at least one first partial block 211 and at least one second partial block 212, and the number of the first partial block 211 corresponds to the number of the light-emitting element 31. For example, supposed that the number of the light-emitting element 31 is one, the number of the first partial block 211 is also one. In this embodiment, the number of the light-emitting element 31 is twelve, and thus the number of the first partial block 211 is also twelve. The first partial blocks 211 are spaced apart from each other, and the position of each of the first partial blocks 211 corresponds to the position of a corresponding one of the light-emitting elements 31, so that each of the light-emitting elements 31 is adjacent to a corresponding one of the first partial blocks 211 of the light-guiding cover plate 21.

Furthermore, as shown in FIG. 2 and FIG. 3, the second partial block 212 is a portion of the light-guiding cover plate 21 not corresponding to the light-emitting element 31. In this embodiment, the number of the second partial block 212 of the light-guiding cover plate 21 is plural, the second partial blocks 212 are spaced apart from each other, and each of the second partial blocks 212 is connected between corresponding two adjacent first partial blocks 211.

As shown in FIG. 3 to FIG. 5, the light-shielding member 40 is disposed in the casing 20, and the number of the light-shielding member 40 corresponds to the number of the light-emitting element 31. For example, in this embodiment, the number of the light-emitting element 31 is twelve, and thus the number of the light-shielding member 40 is also twelve. The light-shielding members 40 are spaced apart from each other, each of the light-shielding members 40 is a block or a plate made of opaque material(s), and each of the light-shielding members 40 is blocked between a corresponding one of the light-emitting element 31 and a corresponding one of the first partial blocks 211. In other words, in this embodiment, the light emitted by each of the light-emitting elements 31 is blocked by the corresponding one of the light-shielding members 40 and thus cannot be directly transmitted toward the corresponding one of the first partial blocks 211. Therefore, the issue of excessive luminance on some portions of the light-guiding cover plate 21 (such as the first partial blocks 211) can be prevented.

Furthermore, as shown in FIG. 3, the boundary line B of each of the first partial blocks 211 of the light-guiding cover plate 21 may be determined according to the shape or the size of the corresponding one of the light-shielding members 40. For example, if the surface of the light-guiding cover plate 21 is a projection surface, each of the light-shielding members 40 can have an orthographic projection range after being projected to the surface of the light-guiding cover plate 21, and the boundary line B of each of the first partial blocks 211 corresponds to the periphery of the orthographic projection range of the corresponding one of the light-shielding members 40. In other words, in this embodiment, the shape and the position of the boundary line B of each of the first partial blocks 211 may correspond to the shape and the position of the surface of the corresponding one of the light-shielding members 40 facing the light-guiding cover plate 21.

In some embodiments, the number of the first partial block 211 of the light-guiding cover plate 21 may not be equal to the number of the light-emitting element 31. For example, the number of the first partial block 211 may be greater than the number of the light-emitting element 31, depending on the actual product demands.

As shown in FIG. 3 to FIG. 5, the first light-guiding member 50 is disposed in the casing 20. In this embodiment, the number of the first light-guiding member 50 corresponds to the number of the light-emitting element 31 (here, the number of the first light-guiding member 50 is also twelve), and the first light-guiding members 50 are spaced apart from each other. Each of the first light-guiding members 50 has a first reflective inclination surface 51, the first reflective inclination surface 51 of each of the first light-guiding members 50 is at a light-emitting direction of a corresponding one of the light-emitting elements 31, and the first reflective inclination surface 51 of each of the first light-guiding members 50 is configured to reflect a light L emitted by a corresponding one of the light-emitting elements 31. In some embodiments, the angle between the first reflective inclination surface 51 and the circuit board 30 may be 30 degrees, 45 degrees (as shown in FIG. 5), or 60 degrees, depending on actual product demands.

In some embodiments, the number of the first light-guiding member 50 may be not equal to the number of the light-emitting element 31. For example, the number of the first light-guiding member 50 may be greater than the number of the light-emitting element 31, depending on the actual product demands.

In some embodiments, each of the first light-guiding members 50 is a block or a plate, and each of the first light-guiding members 50 may be made of light color material(s). For example, the light color material may be white or pale yellow plastic materials, or the light color material may be dyed plastic materials (for example, dyed plastic materials with silver, gold, pale blue, pale green, or pale gray), so that the first reflective inclination surface 51 of each of the first light-guiding members 50 can have the light reflection function. Alternatively, in some embodiments, the first reflective inclination surface 51 of each of the first light-guiding members 50 has a light reflection layer 52 (as shown in FIG. 5). For example, the light reflection layer 52 may be a light color ink layer printed or coated on the first reflective inclination surface 51. For instance, the light color ink layer may be an ink layer with white, silver, gold, pale blue, pale green, pale yellow, or pale gray to have light reflection function. In a further option, in some embodiments, the light reflection layer 52 may be a light color thin film layer. For example, the light color thin film layer may be a glass reflective film, a PET reflective film, a PVC reflective film, or other light color thin films to have light reflection function.

As shown in FIG. 5, when the light-emitting element 31 emits the light L, the first reflective inclination surface 51 of the first light-guiding member 50 can reflect the light L to be a first reflected light L1, and the first reflected light L1 is transmitted toward a direction away from the first partial block 211. In some embodiments, specifically, take one of the light-emitting elements 31 as an example, the light-guiding cover plate 21 has the first partial block 211 which is closest to the light-emitting element 31; when the light-emitting element 31 emits the light L, the first reflective inclination surface 51 reflects the light L to be the first reflected light L1, and the first reflected light L1 is transmitted toward a direction away from the first partial block 211 which is closest to the light-emitting element 31, so that the light L can be reflected by the first reflective inclination surface 51 so as to be diffused into the casing 20.

As shown in FIG. 2 to FIG. 6, the second light-guiding member 60 is disposed in the casing 20, and each of the light-emitting elements 31 is between a corresponding one of the light-shielding members 40 and the second light-guiding member 60. The second light-guiding member 60 may be a block or a plate. For example, in this embodiment, the second light-guiding member 60 is an annular block to correspond to the shape of the light-guiding cover plate 21, and the second light-guiding member 60 has a second reflective inclination surface 61. The number of the second reflective inclination surface 61 corresponds to the number of the light-emitting element 31 (here, the number of the second reflective inclination surface 61 is also twelve), the second reflective inclination surfaces 61 are spaced apart from each other, and each of the second reflective inclination surfaces 61 is adjacent to a corresponding one of the first light-guiding members 50. Each of the second reflective inclination surfaces 61 is at a reflection direction of the first reflective inclination surface 51 of an adjacent one of the first light-guiding members 50, and each of the second reflective inclination surfaces 61 is configured to reflect the first reflected light L1 reflected by the first reflective inclination surface 51 of the corresponding one of the first light-guiding members 50 to be a second reflected light L2, and the second reflected light L2 is irradiated to the second partial block 212 of the light-guiding cover plate 21.

In some embodiments, specifically, as shown in FIG. 5 and FIG. 6, take one of the light-emitting elements 31 as an example, when the light L emitted by the light-emitting element 31 is reflected by the first reflective inclination surface 51 of the first light-guiding member 50 and diffused to be the first reflected light L1, the first reflected light L1 is transmitted to the second reflective inclination surface 61 of the second light-guiding member 60 in a direction away from the first partial block 211, and the first reflected light L1 is reflected by the second reflective inclination surface 61 again and diffused to be the second reflected light L2. The second reflected light L2 passes through the space between adjacent two light-shielding members 40 so as to be transmitted to the second partial block 212 of the light-guiding cover plate 21 not corresponding to the light-emitting element 31. Therefore, the second reflected light L2 can be transmitted inside the light-guiding cover plate 21 and reflected several times to different portions inside the light-guiding cover plate 21, thus allowing the light-guiding cover plate 21 to illuminate uniformly, rather than having the issue of excessive luminance on some portions of the light-guiding cover plate 21.

Based on the above, in the electronic device 1 according to one or some embodiments of the instant disclosure, the light-shielding member 40 is blocked between the light-emitting element 31 and the first partial block 211 of the light-guiding cover plate 21 which is adjacent to the light-emitting element 31. Therefore, the issue of excessive luminance on some portions of the light-guiding cover plate 21 can be prevented. Moreover, the first reflective inclination surface 51 and the second reflective inclination surface 61 sequentially reflect the light L emitted by the light-emitting member 31, so that the light L can be irradiated to the second partial block 212 of the light-guiding cover plate 21 which is not adjacent to the light-emitting element 31, and the illumination range can be further expanded, thus allowing the light-guiding cover plate 21 to illuminate uniformly.

In some embodiments, the second light-guiding member 60 may be made of light color material(s). For example, the light color material may be white or pale yellow plastic materials, or the light color material may be dyed plastic materials (for example, dyed plastic materials with silver, gold, pale blue, pale green, or pale gray), so that the second reflective inclination surface 61 of the second light-guiding member 60 can have the light reflection function. Alternatively, in some embodiments, the second reflective inclination surface 61 of the second light-guiding member 60 has a reflection layer (the same as the light reflection layer 52 mentioned above). For example, the reflection layer may be a light color ink layer printed or coated on the second reflective inclination surface 61. For instance, the light color ink layer may be an ink layer with white, silver, gold, pale blue, pale green, pale yellow, or pale gray to have light reflection function. In a further option, in some embodiments, the reflection layer may be a light color thin film layer. For example, the light color thin film layer may be a glass reflective film, a PET reflective film, a PVC reflective film, or other light color thin films to have light reflection function.

Please refer to FIG. 5 and FIG. 6. In this embodiment, the second light-guiding member 60 further has a third reflective inclination surface 62. The number of the third reflective inclination surface 62 corresponds to the number of the light-emitting element 31 (here, the number of the third reflective inclination surface 62 is also twelve), the third reflective inclination surfaces 62 are spaced apart from each other, and each of the third reflective inclination surfaces 62 is adjacent to a corresponding one of the first light-guiding members 50. The second reflective inclination surface 61 and the third reflective inclination surface 62 are configured to reflect the first reflected light L1 to be several second reflected lights L2, and each of the second reflective inclination surfaces 61 and an adjacent one of the third reflective inclination surfaces 62 are obliquely arranged along different directions (in this embodiment, each of the second reflective inclination surfaces 61 and an adjacent one of the third reflective inclination surfaces 62 are arranged symmetrically), so that the second reflected lights L2 can be diffused and transmitted toward different directions and irradiated to the second partial block 212 of the light-guiding cover plate 21 not corresponding to the light-emitting element 31, and the illumination range can be further expanded, thus allowing the light-guiding cover plate 21 to illuminate more uniformly. Moreover, the same second partial block 212 can be irradiated by the second reflected lights L2 with different directions which are reflected by each of the second reflective inclination surfaces 61 and an adjacent one of the third reflective inclination surfaces 62, thereby achieving the light enhancement performance to ensure the entire light-guiding cover plate 21 to illuminate uniformly.

As shown in FIG. 4 and FIG. 5, in this embodiment, each of the light-shielding members 40 is U-shaped and has a main blocking wall 41 and two side blocking walls 42. The two side blocking walls 42 extend from two opposite sides of the main blocking wall 41, so that a receiving groove 43 and an opening 44 are formed between the main blocking wall 41 and the two side blocking walls 42. The opening 44 is in communication with the receiving groove 43 and faces the second light-guiding member 60. Each of the light-emitting elements 31 is in the receiving groove 43 of a corresponding one of the light-shielding members 40. Therefore, in some embodiments, the main blocking wall 41 and the two side blocking walls 42 of each of the light-shielding members 40 surround a corresponding one of the light-emitting element 31, thus preventing the light L emitted by each of the light-emitting elements 31 from leaking from two sides of a corresponding one of the light-shielding members 40. Moreover, after the light L is reflected by the first reflective inclination surface 51 of the first light-guiding member 50 to be the first reflected light L1, the first reflected light L1 can be collectively transmitted through the opening 44 and thus transmitted to the second reflective inclination surface 61 and the third reflective inclination surface 62 of the second light-guiding member 60, thereby preventing the loss of the light energy and thus increasing the illumination efficiency.

Figure 7:
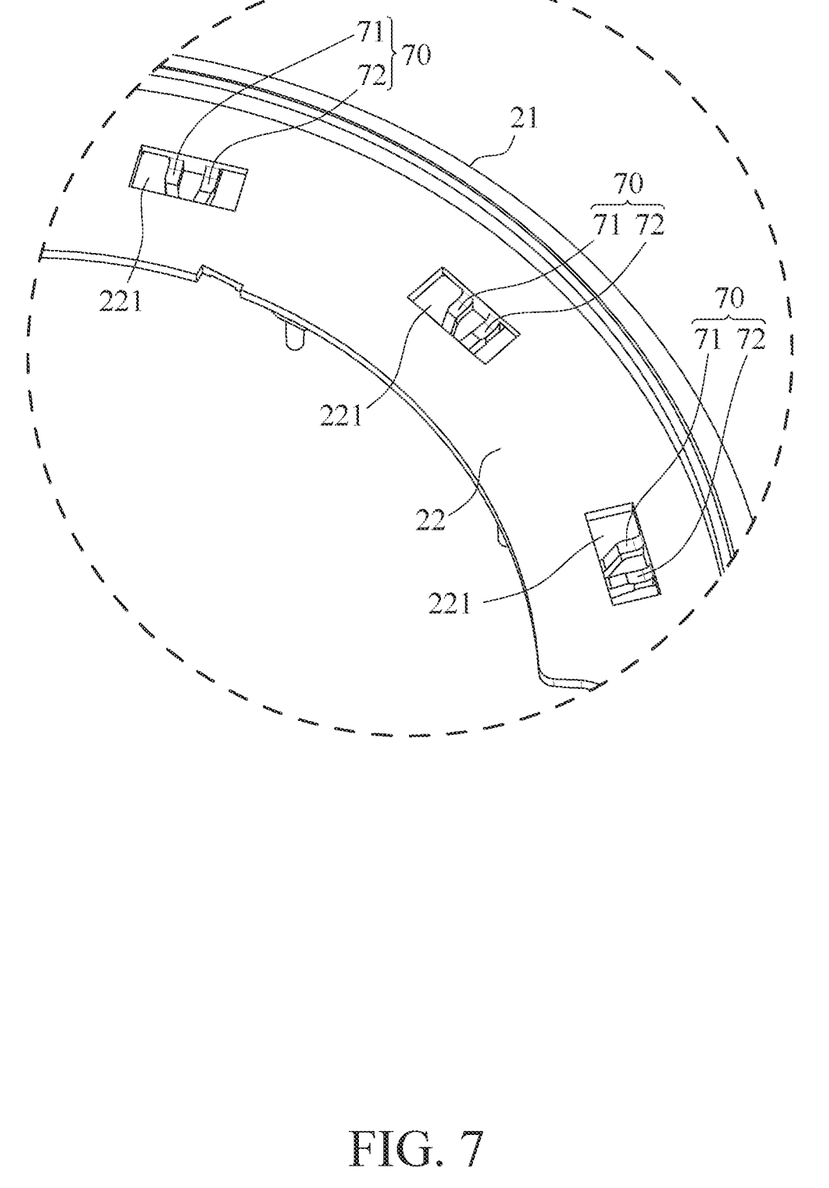
FIG. 7 illustrates another enlarged partial perspective view of the electronic device of the first embodiment of the instant disclosure.

FIG. 7 illustrates another enlarged partial perspective view of the electronic device of the first embodiment of the instant disclosure. As shown in FIG. 2, FIG. 3, and FIG. 5 to FIG. 7, in some embodiments, the electronic device 1 further comprises a third light-guiding member 70, and the third light-guiding member 70 is disposed in the casing 20. The third light-guiding member 70 is made of a light transmissive material. In this embodiment, the number of the third light-guiding member 70 corresponds to the number of the light-emitting element 31 (here, the number of the light-guiding member 70 is also twelve), and each of the third light-guiding members 70 is between a corresponding one of the first light-guiding members 50 and the second light-guiding member 60. Therefore, after the light L emitted by the light-emitting element 31 is reflected by the first reflective inclination surface 51 of the first light-guiding member 50 and diffused to be the first reflected light L1, the first reflected light L1 is further refracted by the third light-guiding member 70 and then irradiated to the second reflective inclination surface 61 and the third reflective inclination surface 62 of the second light-guiding member 60, thereby further expanding the illumination range.

Furthermore, as shown in FIG. 2, FIG. 3, and FIG. 5 to FIG. 7, in this embodiment, an extension plate 22 is further in the casing 20, and the extension plate 22 is integrally connected to an inner periphery of the light-guiding cover plate 21. Moreover, the extension plate 22 has a plurality of through holes 221 arranged annularly. Each of the light-emitting elements 31 of the circuit board 30 is in a corresponding one of the through holes 221, and each of the third light-guiding members 70 is in a corresponding one of the through holes 221 and integrally connected to the extension plate 22, so that the third light-guiding members 70, the extension plate 22, and the light-guiding cover plate 21 are integrally connected to each other to form a one-piece structure. In other words, in this embodiment, components for light transmission are connected to each other to form a one-piece structure, thus reducing the number of the components of the electronic device 1 and increasing the manufacturing and assembling efficiency for the electronic device 1.

Moreover, as shown in FIG. 2 and FIG. 4, the light-shielding members 40, the first light-guiding members 50, and the second light-guiding member 60 may be integrally formed as a one-piece structure. For example, in this embodiment, the light-shielding members 40, the first light-guiding members 50, and the second light-guiding member

60 are integrally connected to a base member 80. In other words, in this embodiment, during the assembling process of the electronic device 1, the operator just needs to assemble the base member 80 with the light-guiding cover plate 21 and the circuit board 30, the components of the electronic device 1 can be positioned, thus reducing the number of the components of the electronic device 1 and increasing the manufacturing and assembling efficiency for the electronic device 1. In some embodiments, the base member 80, the light-guiding cover plate 21, and the circuit board 30 may be assembled with each other through adhering, engaging, locking, or other manners.

As shown in FIG. 6 and FIG. 7, in this embodiment, each of the third light-guiding members 70 comprises a first light-transmitting post 71 and a second light-transmitting post 72. The first light-transmitting post 71 and the second light-transmitting post 72 are respectively at two opposite sides of the fist reflective inclination surface 51 of the first light-guiding member 50. The first light-transmitting post 71 is between the first reflective inclination surface 51 and the second reflective inclination surface 61, and the second light-transmitting post 72 is between the first reflective inclination surface 51 and the third reflective inclination surface 62. Therefore, after the light L emitted by the light-emitting element 31 is reflected by the first reflective inclination surface 51 of the first light-guiding member 50 and diffused to be the first reflected light L1, the first reflected light L1 can be refracted by the first light-transmitting post 71 so as to be irradiated to the second reflective inclination surface 61 and refracted by the second light-transmitting post 72 so as to be irradiated to the third reflective inclination surface 62, respectively.

Moreover, as shown in FIG. 6 and FIG. 7, the first light-transmitting post 71 and the second light-transmitting post 72 of the third light-guiding member 70 are not arranged in parallel. In this embodiment, the first light-transmitting post 71 and the second light-transmitting post 72 are arranged obliquely to have different inclination angles. One of two ends of the first light-transmitting post 71 is connected to one of two ends of the second light-transmitting post 72, and the other end of the first light-transmitting post 71 and the other end of the second light-transmitting post 72 are spaced apart from each other, so that the light L emitted by each of the light-emitting elements 31 can pass through the space between the first light-transmitting post 71 and the second light-transmitting post 72 of a corresponding one of the third light-guiding members 70 so as to be transmitted to the first reflective inclination surface 51 of a corresponding one of the first light-guiding members 50.

Figure 8:
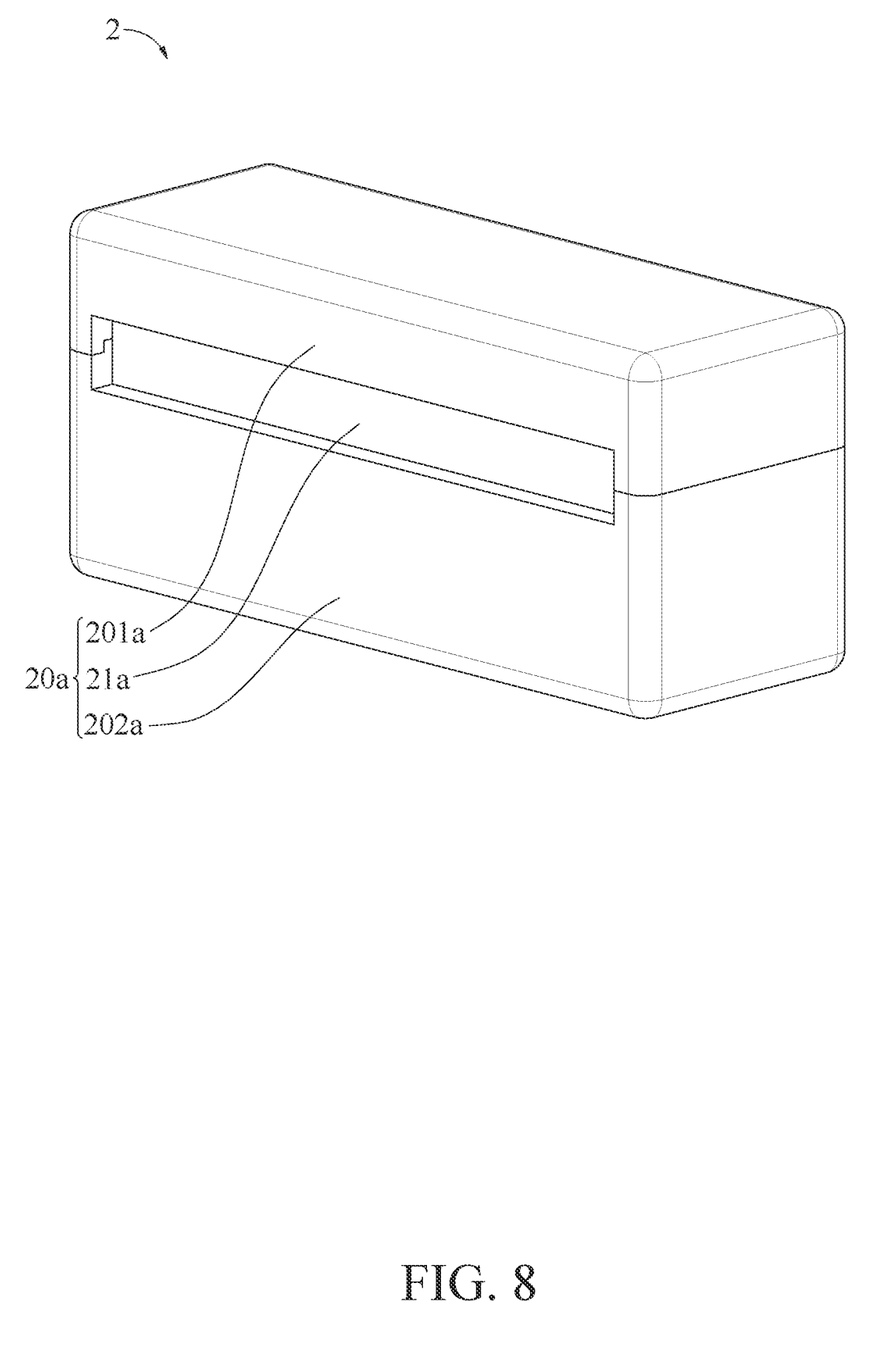
FIG. 8 illustrates a perspective view of an electronic device according to a second embodiment of the instant disclosure.
Figure 9:
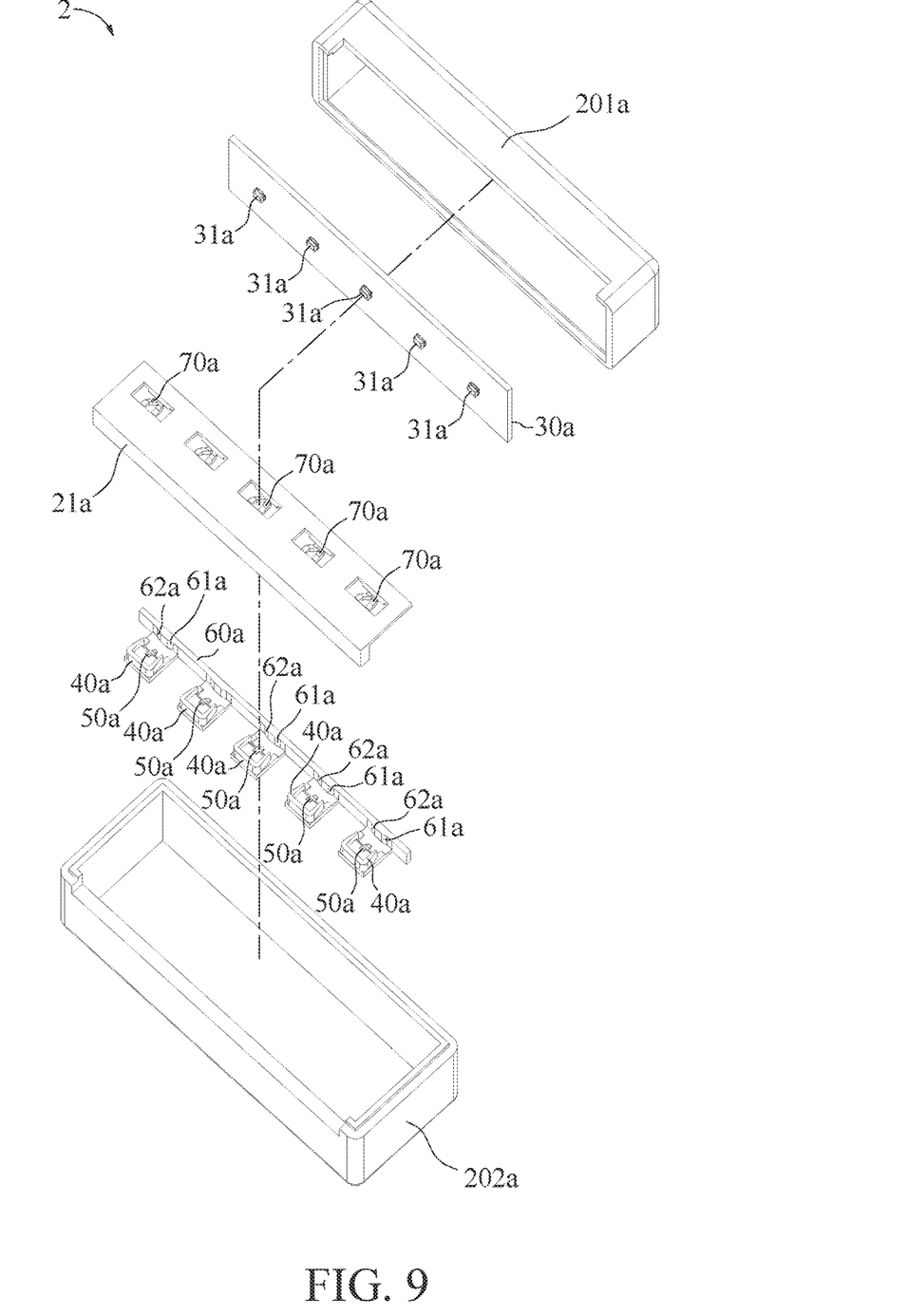
FIG. 9 illustrates an exploded view of the electronic device of the second embodiment of the instant disclosure.
Figure 10:
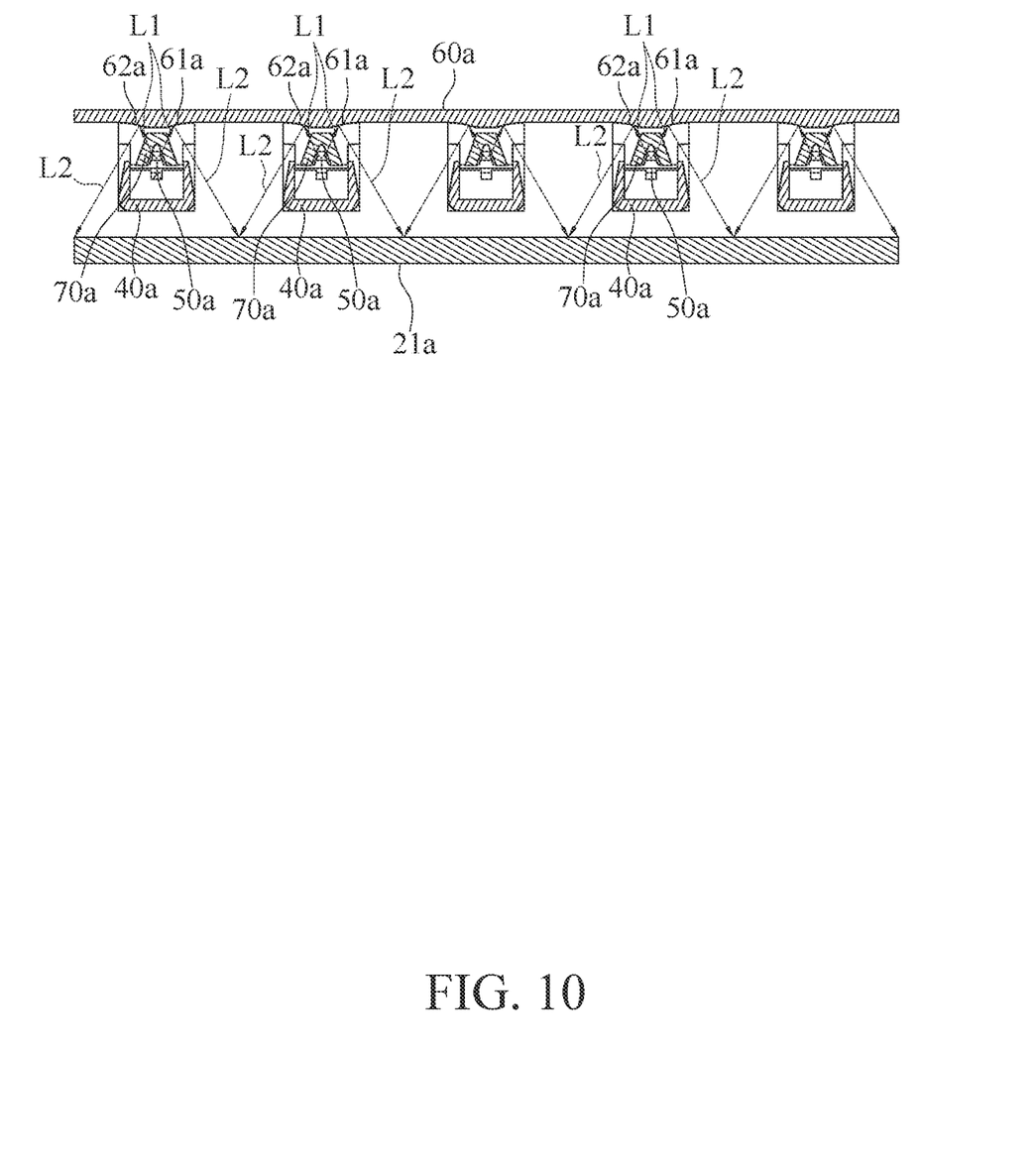
FIG. 10 illustrates a cross-sectional view of the electronic device of the second embodiment of the instant disclosure.

FIG. 8 illustrates a perspective view of an electronic device according to a second embodiment of the instant disclosure. FIG. 9 illustrates an exploded view of the electronic device of the second embodiment of the instant disclosure. FIG. 10 illustrates a cross-sectional view of the electronic device of the second embodiment of the instant disclosure. As shown in FIG. 8 to FIG. 10, likewise, in this embodiment, the electronic device 2 comprise a casing 20*a*, a circuit board 30*a*, a plurality of light-shielding members 40*a*, a plurality of first light-guiding member 50*a*, a second light-guiding member 60*a*, and a plurality of third light-guiding members 70*a*. The casing 20 comprises a first case body 201*a*, a second case body 202*a*, and a light-guiding cover plate 21*a*, and the light-guiding cover plate 21*a* is assembled between the first case body 201*a* and the second case body 202*a*.

As shown in FIG. 8 to FIG. 10, the difference between this embodiment and the first embodiment shown in FIG. 1 to FIG. 7 is at least that, in this embodiment, the shape of the casing 20*a* of the electronic device 2 is rectangular, the shapes of the light-guiding cover plate 21*a* and the circuit board 30*a* are rectangular, and the light-emitting elements 31*a* on the circuit board 30*a* are arranged spaced apart from each other and arranged linearly. Likewise, the light-shielding members 40*a*, the first light-guiding members 50*a*, the second reflective inclination surfaces 61*a* of the second light-guiding member 60*a*, the third reflective inclination surfaces 62*a* of the second light-guiding member 60*a*, and the third light-guiding members 70*a* are arranged spaced apart from each other and arranged linearly to correspond to the arrangement of the light-emitting elements 31*a*. Therefore, comparing the electronic device 2 of this embodiment with the electronic device 1 of the first embodiments, except the shape and the arrangement of the components between the two embodiments are different, the connection or relative positional relationship among the components are substantially the same, and the same light path and same performance can be obtained (for example, as comparing FIG. 6 with FIG. 10), thus allowing the light-guiding cover plate 21*a* to illuminate uniformly, preventing from the issue of excessive luminance on some portions of the light-guiding cover plate 21*a*. The detail descriptions about the uniform illumination for the second embodiment are not repeated here.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An electronic device with light emitting function comprising:
   a casing having a light-guiding cover plate, wherein the light-guiding cover plate has a first partial block and a second partial block;
   a circuit board disposed in the casing, wherein the circuit board has a light-emitting element, and the light-emitting element is adjacent to the first partial block of the light-guiding cover plate;
   a light-shielding member disposed in the casing, wherein the light-shielding member is blocked between the light-emitting element and the first partial block;
   a first light-guiding member disposed in the casing, wherein the first light-guiding member has a first reflective inclination surface, the first reflective inclination surface is at a light-emitting direction of the light-emitting element, the first reflective inclination surface is configured to reflect a light emitted by the light-emitting element to be a first reflected light, and the first reflected light is transmitted to a direction away from the first partial block;
   a second light-guiding member disposed in the casing, wherein the light-emitting element is between the light-shielding member and the second light-guiding member, the second light-guiding member has a second reflective inclination surface, the second reflective inclination surface is configured to reflect the first reflected light to be a second reflected light, and the second reflected light is irradiated to the second partial block of the light-guiding cover plate.

2. The electronic device with light emitting function according to claim 1, wherein the light-shielding member has a main blocking wall and two side blocking walls, and the two side blocking walls extend from two opposite sides of the main blocking wall, so that a receiving groove and an opening are formed between the main blocking wall and the two side blocking walls; the light-emitting element is in the receiving groove, and the opening is in communication with the receiving groove and faces the second light-guiding member.

3. The electronic device with light emitting function according to claim 1, further comprising a third light-guiding member, wherein the third light-guiding member is disposed in the casing and between the first light-guiding member and the second light-guiding member, the first reflected light is refracted by the third light-guiding member to be irradiated to the second reflective inclination surface of the second light-guiding member.

4. The electronic device with light emitting function according to claim 3, wherein the third light-guiding member comprises a first light-transmitting post and a second light-transmitting post, and the first light-transmitting post and the second light-transmitting post are respectively at two opposite sides of the first reflective inclination surface; the second light-guiding member further has a third reflective inclination surface, the first light-transmitting post is between the first reflective inclination surface and the second reflective inclination surface, the second light-transmitting post is between the first reflective inclination surface and the third reflective inclination surface, and the first reflected light is refracted by the first light-transmitting post and the second light-transmitting post and irradiated to the second reflective inclination surface and the third reflective inclination surface.

5. The electronic device with light emitting function according to claim 4, wherein the first light-transmitting post and the second light-transmitting post are not arranged in parallel.

6. The electronic device with light emitting function according to claim 3, wherein the third light-guiding member is integrally connected to the light-guiding cover plate.

7. The electronic device with light emitting function according to claim 1, wherein the light-shielding member, the first light-guiding member, and the second light-guiding member are integrally connected to a base member.

8. The electronic device with light emitting function according to claim 7, wherein the base member is assembled with the light-guiding cover plate and the circuit board.

9. The electronic device with light emitting function according to claim 1, wherein the number of the light-emitting element, the number of the first partial block, the number of the second partial block, the number of the light-shielding member, and the number of the first light-guiding member are plural; the light-emitting elements are spaced apart from each other; the first partial blocks are adjacent to the light-emitting elements, respectively; each of the second partial blocks is connected between corresponding two of the first partial blocks, the light-shielding members are blocked between the light-emitting elements and the first partial blocks, respectively; the first reflective inclination surface of each of the first light-guiding member is at a light-emitting direction of a corresponding one of the light-emitting elements, and each of the light-emitting elements is between a corresponding one of the light-shielding members and the second light-guiding member.

10. The electronic device with light emitting function according to claim 9, wherein the light-emitting elements are arranged annularly, and the light-guiding cover plate is an annular shaped cover plate.

* * * * *